Sept. 17, 1963 K. A. METCALFE ET AL 3,104,169

PRODUCTION OF PRINTING BLOCKS, RESISTS, TRANSPARENCIES, PRINTS AND THE LIKE BY ELECTRO-DEPOSITION

Filed June 14, 1957

3,104,169
Patented Sept. 17, 1963

3,104,169

PRODUCTION OF PRINTING BLOCKS, RESISTS, TRANSPARENCIES, PRINTS AND THE LIKE BY ELECTRO-DEPOSITION

Kenneth A. Metcalfe, Graymore, South Australia, and Robert J. Wright, South Payneham, South Australia, Australia, assignors to The Commonwealth of Australia, care of the Secretary of the Department of Supply, Melbourne, Victoria, Australia Filed June 14, 1957, Ser. No. 665,757
Claims priority, application Australia June 27, 1956
3 Claims. (Cl. 96—1)

This invention relates to the production of printing blocks, resists, transparencies, prints and the like by electro-deposition.

Printing blocks are currently produced by photographing onto a zinc or similar plate which is then treated to form a resist so that selected portions can be chemically etched.

Resist patterns are formed by using a suitable substance which has been rendered light sensitive so that, after an image is directed on through a screen, that portion of the surface where the resist material has not been fixed by the light can be washed away to expose the under surface or substrate for etching.

Another method of forming a resist or making a mask utilizes an electrostatic process in which there is converted a light image or electrical signal into an electrical charge pattern on an electrical insulating base. The process may also include the conversion of a charge pattern into a visible image.

A typical electrostatic method of masking may include coating a surface of a relatively conductive backing with a photoconductive composition comprising a suspension of a photoconductor in an insulating base and then removing the coating material from selected areas of the said coating prior to etching. These areas may be selected by producing an electrostatic image directly on the surface of the photoconductive coating, developing the image with a developer powder, fixing the developer powder to the dry coating and then removing the coating material in the areas of the coating not covered by the fixed powder image.

The masks prepared by the chemical etching processes although successful have the disadvantages that they require chemical treatment, long exposures, and exposures from very strong light sources, and they permit the use of the photosenstive plate only once and soon after its preparation.

The masks prepared by known electrostatic printing processes with photo-insulators also have limitations which include loss of image detail and definition when dry powders are transferred from the photoconductive coating to the surface to be masked, the photoconductive material must be cleaned after each use, the plate bearing the photoconductive material is rigid, making it difficult or impossible to transfer the dry powder images to non-flexible surfaces, in the case of selenium plates the plate must be stored for a definite period of time after each use due to plate fatigue, and limited life, instability, fragility and high costs in the case of vacuum coated selenium plates.

A process involving volatile photoconductors and volatilization of the coating after dry development has the following difficulties: firstly noxious fumes are evolved during evaporation of the photoconductive material, secondly the process is not easily adaptable to use in business offices, thirdly the photoconductive material is limited to materials that have a relatively low boiling point and fourthly the developer material is limited to materials that have relatively low melting points.

The masks prepared by the third method have the following disadvantages: to fix the powder image in a permanent manner, it is necessary to heat the deposited dust which because of the melting of the relatively coarse dust causes a loss of definition in the image, and in the case of screened images this causes poor dot formation; and etching cannot be effected until the photoconductive material has been removed by dissolving or washing it away.

A still further method, generally known as the "Electrofax" method, consists in melting a resist material, after dry electrostatic deposition to form the resist, but the method requires heating with consequent grain or clumping effect and thus solid surface work is not possible.

The objects of the present invention are to improve the image, resist or mask and to reproduce it in a better and more direct and a quicker manner with less steps. According to the simplest form of the invention a surface, such as a plate which is to be etched to form a block, or a transparent surface, has a photoconductor coating formed upon it which may be removed by etching or other means and will hold an electrical charge so that when the image is exposed thereon in any manner to vary the charge in conformity with the image, a second surface can be deposited thereon by liquid development according to the charge at any locality, and similarly a third surface if this is required. By appropriately forming the two coatings a resist can result which can then be used to control etching in normal manner, or which can form a printing mat or a print itself in monotone or in color.

By having the photoconductive layer of a material which can be etched away, etching can commence immediately the resist has been deposited on it.

According to one form of the invention, a coating of zinc oxide or other suitable material can be etched or dissolved away has incorporated in it a controlled quantity of a resin or similar substance which is resistant to the etching or solvent medium, but is in insufficient quantity to remain in position when the zinc oxide or the like is removed, and this surface is then charged (prior to exposure to the image to be transferred thereon) at a relatively high potential.

After the image has been projected or impressed on this base and the electrical pattern thereof changed accordingly, the treated surface is subject to the deposition of a liquid developer again consisting of zinc oxide or other material combined with a resin or other binder so that the image is formed by this second coating and dries on evaporation of the carried liquid. However, the proportion or ratio of the zinc oxide to the resin or the like is varied to form a resist in which the zinc oxide or the like is protected by the resin or the like.

The first coating, which is applied purely for the purpose of holding the electrical charge is thus arranged to have only a very low resin or binder content or ratio so that the zinc oxide or the like can readily be etched away to leave a pervious film of the resin, but the developer has a higher content or ratio of resin or binder so that it forms an effective resist for the subsequent etching or other processing.

The advantages of this method will, of course, be at once apparent when it is considered that the zinc plate or the like need only to be given a thin coating of a substance which is suitable to hold an electrical charge, combined with a resist agent such as a resin, and this plate so prepared is then exposed to light or to a printing block or the like which will vary the electrical pattern in accordance with the image or pattern.

It is now only necessary to run the liquid developer over the surface and the image is at once formed and the resist is then completely ready for etching without any further treatment.

The base of zinc oxide or the like can be extremely thin and can itself be conveniently deposited on any suitable surface by suspending the base in a non-conducting liquid of high electrical resistance, and suspending the coating material in this liquid and then applying a potential across the liquid to cause deposition of the suspended particles or colloid on to the surface, it having been found that in this way an extremely thin and uniform coating can be deposited on any face. If this coating has a very low content of the bonding medium such as a resin as has been noted, the coating while capable of taking and holding a charge, can readily have any unprotected areas removed by etching or a solvent or the like.

By depositing the developer onto the surface in the same way after exposure, it is possible to build up the developer to a considerable depth, if such is desirable, and this can itself form a printing block or mat without etching although possibly the outer surface may have to be ground or polished to produce the required flat face, but as previously stated this resist so formed can readily be etched or treated to remove the unprotected coating and then any uncovered base such as a zinc plate or copper plate or sheet.

Advantageously, as will be shown hereinafter, the bonding resist agents for the developer and coating is, in accordance with the invention, of the same material.

To enable this invention to be fully understood, embodiments thereof will now be described with reference to the accompanying drawings.

Figure 1:
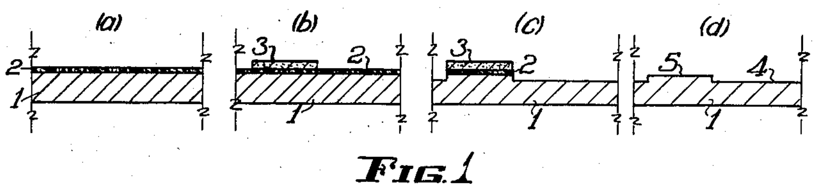
FIG. 1 shows the stages in producing a printing block.

Referring to FIGURE 1(*a*), a surface of a relatively conducting backing sheet 1, such as zinc or copper, is given a photoconductive coating or insulative layer 2 having a composition comprising a colloidal or nearly colloidal photoconductor in an insulating film-forming vehicle thereby prducing a printing base. Referring to FIGURE 1(*b*) an electorstatic image is produced on the photoconductive coating 2, and developed with a liquid developer that may contain a powder and a fixing or bonding resist agent, or the powder may be the fixing agent or the fixing agent may be the powder or colloidal suspension or solution, and is of such composition that the finally developed image is permanent and is acid or alkali or solvent resistant. The developed image is numbered 3. Referring to FIGURE 1(*c*) the areas of the photo-conductive coating 1 not covered by the fixed image are removed by etching or solvent which is continued to the desired depth by the same etching or solvent medium. Referring to FIGURE 1(*d*) the remaining photoconductive coating 1 and the fixed image 2 are then removed and the plate is ready for printing, the etched portion being shown by 4 and the printing face by 5. The plate may be ready for printing without removal of the photoconductor coating 1 and the fixed image 2, and in the case of a photogravure the ink is held by the etched portions.

A typical photoconductive coating with the necessary permeability to acid or alkali may be prepared from the following materials: 50 grams of a linseed modified alkyd resin of oil length 40%, acid value 25 to 35, specific gravity at 20° C. 0.989 to 0.999, such as that marketed under the trademark "Rhodene L9/50" as the bonding resist agent, 100 grams of toluene, 200 gram of fine gram, non-fluorescent zinc oxide paint pigment, such as that marketed under the trademark "Durham Microx" zinc oxide, and 0.5 gram each of cobalt napthenate and manganese napthenate. This liquid mixture is ball milled for four hours and then applied to the surface of the base plate to form a photoconductive coating.

Figure 5:
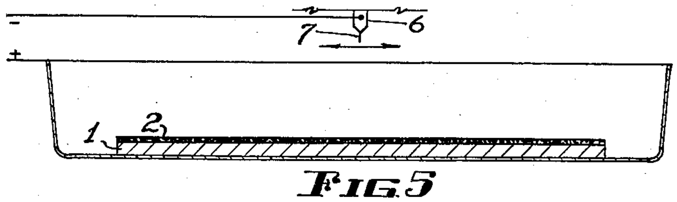
FIGS. 5, 6 and 7 show stages in the production of any of the above.

Referring to FIGURE 5, the zinc or copper plate or layer 1 of the printing base of FIGURE 1(*a*) is grounded and an electrostatic charging device 6 is passed in the relative darkness over the photoconductor coating 2 of the printing base to provide an overall electrostatic charge thereon. The charging device may comprise a point or an array of points 7 mounted over the grounded zinc or copper layer 1. A source of D.C. high voltage is connected between the point or points 7 and the grounded zinc or copper plate 1 to provide a negative charge on the point with respect to the zinc or copper plate 1. The printing base passed under the charging device 6 becomes charged negatively. The apparatus and process may produce an overall positive charge if the polarity of the point 7 is positive with respect to the copper or zinc plate 1.

Figure 6:
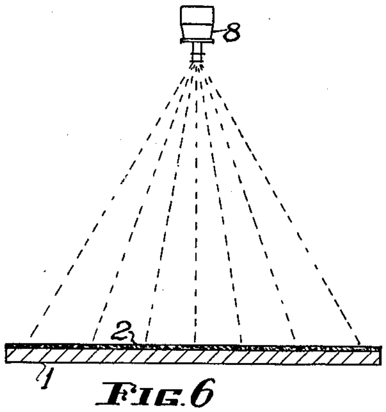

The next step in the processing is to discharge selected parts of the charged surface of the printing in order to produce an electrostatic pattern thereon. Referring to FIGURE 6, this may be accomplished by exposing the charged printed surface 2 to an optical image, derived for example from a positive reproduction of the desired subject, the printing base being contained in a camera which is arranged to focus an image on the charged photoconductive surface 2. Wherever the light strikes the surface of the photoconductive surface 2, the electrostatic charge thereon is reduced or removed. This leaves an electrostatic image or pattern of charges corresponding to the dark portions of the image. Other methods of producing electrostatic latent images may be used.

Figure 7:
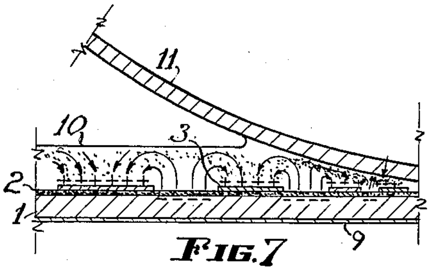

The next step is to develop the electrostatic image with a material which will subsequently prevent the etching solution from attacking the zinc or copper layer 1, in these areas. Referring to FIGURE 7, development may be accomplished by maintaining the printing layer in darkness and immersing it in a tank or tray containing the liquid developer 10. The developer materials are deposited on those areas of the surface retaining an electrostatic charge, or by choice of suitable developer, materials may be deposited on those areas of the surface from which the charge has been removed or reduced, or reversed by exposure.

A preferred developer paste may be prepared as follows: A mixture comprising 100 grams of aluminium powder mixed with an organic solvent such as mineral turpentine or toluene is dispersed by ball milling in a varnish base consisting for instance of 100 grams of a dehydrated castor oil modified alkyd resin of oil length 50%, acid value 6 to 10, and specific gravity 0.960 to 0.970, such as that known under the trademark Rhodene L26/50, is dispersed in 100 grams of solvent such as toluene. The individual particles of this paste take on a positive charge when suspended in a liquid of high volume resistivity and low dielectric constant such as cyclohexane or carbon tetrachloride. It therefore develops an electrostatic image composed of negative charges in a photographically positive manner. To make the developer mix there is blended together 1 to 10 grams of the paste and 100 grams of the insulating liquid or in that ratio. Other ratios may be used.

The developer paste may be chosen from a large number of materials. The developer powder or solid substance is preferably a material which will form, when fixed in conjunction with a resin or the like to the photoconductor or insulator coating, an acid or alkali resistant layer. By virtue of its being suspended in a liquid of high volume resistivity and low dielectric constant the solid-resin mixture acquires an electric charge of constant polarity and intensity for any particular mixture. This property allows complete and uniform proportionality to be attained in the development of the electrostatic image. Examples of suitable developer materials include: carbon, sulphur, red lead, powdered aluminium, iron oxide, and powdered or emulsified plastics or synthetic resins or mixtures thereof to give the required chemical, electrical or adhesive properties. Alternatively, if it is desired that the developer particles or globules shall adhere to an electrostatic image composed of positive charges, these materials in powdered or globular form may be mixed with linseed oil or other drying oil.

The drawing designated FIGURE 7 shows diagrammatically how development takes place with a liquid developer, the zinc or copper layer of the printing base being again designated 1, the photoconductive coating 2, the developed image 3, the floor of the tray 9, the liquid 10, and a roller 11. It is to be noted that when the photoconductor coating 2 is submerged in the liquid 10, a flow of developer particles, indicated as dots, takes place somewhat in the direction of the arrows, the particles of course moving freely under the known laws governing particles suspended in insulating liquids, but because of their polarity being moved to the charged areas of the photoconductive coating 2 to be attached to the areas to form the image 3, the movement of the particles denuding the liquid at the areas between to leave that surface clear, the action of the roller assisting rapid development by acting as an electrode to intensify movement of the particles into proximity with the charged surface of the photoconductor 2, and to receive particles where the particles are denuded from the areas.

Referring to FIGUURE 1(*c*), after development of the image and evaporation of the developer liquid remaining on the photoconductive layer, a solvent for the photoconductive coating is now applied to the surface of the image carrying plate in order to remove the non-image areas of the photoconductive coating while leaving undisturbed those areas of the coating carrying the developed image. This solvent may be the acid to be used for the etching of the zinc or copper plate, the operations illustrated in FIGURES 1(*c*) and 1(*d*) being conveniently performed in the one etching bath as the photoconductive layer is permeable to the etching medium in the undeveloped areas. The selection of the composition of the photoconductive medium 2, the developer material 3 and the solvent is made realising that these are interdependent. That is, the photoconductive coating 2 should comprise an insulating film forming resin or the like that is soluble or decomposed by some solvent or is permeable to some solvent, and the fixed image should be of some material which is not affected by the action of this solvent and the etching medium, should the two not be the same.

In the case of copper, a 40° Baumé ferric chloride solution will be found satisfactory, while in the case of zinc, 10 percent nitric acid will give an etch of the required depth and quality.

Upon etching of the zinc or copper layer 1, in the areas not coated by the fixed image, the plate is dried and may then be used. Referring to FIGURE 1(*d*), if it is desired the remainder of the photoconductive layer and the fixed image may then be removed using suitable solvents, leaving only the etched printing plate.

Figure 2:
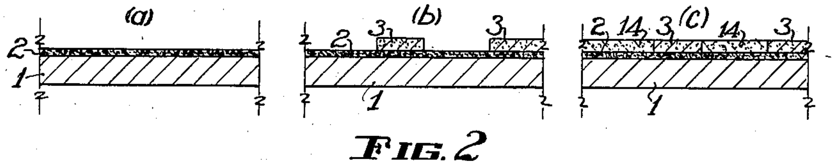
FIG. 2 shows the stages in the production of a lithographic plate.

A lithographic printing plate or element may also be prepared according to the method of this invention. A surface of a relatively conductive sheet 1 is covered with a coating 2 comprising a powdered or colloidal photoconductive material suspended in an insulating film forming vehicle, producing a printing base or element as shown in FIG. 2(*a*). An electrostatic image is produced upon this coating and developed with a hydrophobic developing compound 3 suspended in an insulating liquid to produce the developed image 3, FIG. 2(*b*). After development, the undeveloped portions of the image are coated with a hydrophilic material 14 also by electrodeposition from an insulating liquid, see FIG. 2(*c*), or the hydrophilic material can be so chosen that it is of the opposite polarity when suspended in the liquid to that of the hydrophobic developer compound and can thus be co-deposited on the non-image bearing portions of the plate at the same time as the image deposit. Alternatively, the conductive sheet may itself be hydrophilic and thus be water receptive after the non-image forming areas of the photoconductive layer have been removed by solvent action.

The photoconductive material described under typographic plates is prepared and coated on the relatively conductive backing preferably by electrodeposition to produce a printing base. An electrostatic image is produced thereon and developed with a liquid developer comprising a hydrophobic compound or mixture dispersed in a liquid of sufficiently high volume resistivity to support the electrostatic charge on the photoconductive surface at least until development is complete. Such a developer can comprise the following paste dispersed in solvent naphtha:

| | Grams |
|---|---|
| Boiled linseed oil | 25 |
| Cadmium selenide (red) | 75 |
| Driers, lead naphthenate | 0.5 |

Disperse 10 grams in liter of solvent naphtha.

In the manufacture of printed circuits or components for use in the electronics industry an insulating sheet or a conductive sheet may be used as a base on which is printed a multiplicity of conductive or insulating or resistive patterns to form an electrical circuit of small size. In the present invention the insulating sheet is first coated with a conductive film or coating such as a metal coating or metal salt or gelatine and the like and subsequently coated with a photoconductive material comprising a colloidal or nearly colloidal dispersion of a photoconductor in an insulating matrix. An electrostatic image is produced upon the photoconductive coating and developed with a liquid developer containing an acid or alkali resistant material or with conductive materials or powders or insulating material or semi-conductor material or electrically resistant material such as carbon. The photoconductor coating that is not covered by the fixed electrostatic developed image may be removed thus exposing the base which then may be removed by etching or by preferential solution in solvents.

The developed image may be built up with a material which subsequently may be made to react with another liquid or gas to form a material having different desired properties.

Figure 3:
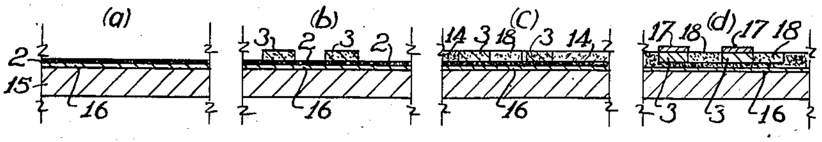
FIG. 3 shows how a printed circuit may be produced.

Referring to FIGURE 3(*a*) the surface of an insulating sheet 1 is coated with a conducting film and subsequently coated with a photoconductive coating 2 having a composition comprising a colloidal or nearly colloidal photoconductor dispersed in an insulating film forming vehicle thereby producing a printing base. An electrostatic image is formed thereon and developed with a developer which may contain in suspension or solution or emulsion a material which is acid or alkali resistant, or an insulator or a conductor or semi-conductor or an electrically resistant material like carbon. In FIG. 3(*b*) the areas of the photoconductive coating not covered by the fixed image 3 have been removed. This may subsequently be covered by another image 17 of different material from the first image (see FIG. 3(*d*)) or the in-between spaces filled in (see FIG. 2(*c*)), where 18 is the filling material, thus forming a pattern or circuit which has differing electrical properties in desired areas.

Figure 4:
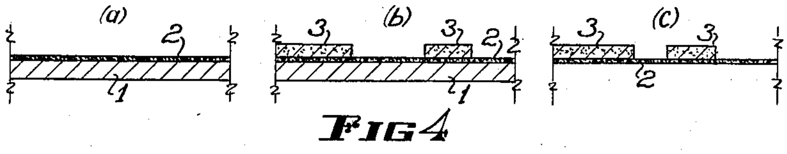
FIG. 4 shows the stages of producing a transparency.

For producing transparencies, a base 1 has a coating 2 on it (see FIG. 4(*a*)), on which the image 3 is produced by liquid development. By controlling the ratio of resin in the base coating 2 it is possible to form a transparency by the method of this invention, by etching away or dissolving the base 1, FIG. 4(*c*), after first depositing thereon the developer to form the image 3, see FIG. 4(*b*). It is found that a thin but strong and durable transparency results in which the image is either shown in relief according to the extent of build-up of the developer or, by adding suitable pigments, the transparencies can be rendered in monotone or in more than one color. It has been found, for instance, that if it is desirable to produce color work the necessary number of exposures can be made on to the same base, provided it is charged each time after development and a new exposure made thereon, each exposure being arranged to resolve a particular tone or color, and as the successively produced pictures are already visible during the exposure stage it is obvious that no difficulties exist with the registering of the various images.

The surface on which the base coating may be deposited may be a transparent material such as film base, glass, clear plastic sheet and the like, provided that the conductivity of the material is greater than that of the photoconductive coating placed on it. In this case the transparencies are formed without the removal of the surface on which the base coating is deposited. The surface may also be metal foil such as copper foil which may subsequently be etched away with nitric acid or it may be gelatine sheet which may subsequently be dissolved away with water, or it may be zinc in the form of a galvanized coating on a rigid steel supporting sheet and this zinc interlayer may be dissolved away with hydrochloric acid and the resin film comes off readily.

The process can also be used with what are commonly termed half-tone blocks or prints by first producing a screen pattern on the base by electrical means or other means such as photographing a screen during the course of exposure or causing the screen to form a pattern on the plate in conjunction with the image during the course of exposure, or a physical screen may be used during the course of the exposure or before or after the exposure, but it has been found convenient to expose the base to the screen pattern prior to the photographing of the image thereon and in this way the difficulty of using or registering the screen is obviated.

An interesting feature of the process for producing a color print or a color transparency is that the density of deposition of the developer varies in proportion to the light values of the image projected on to the surface, so that a screen is unnecessary, the depth of depositing governing the strength of the color so that continuous tones are possible without a screen pattern. Further, the image is not subject to grain effects for all practical purposes, as a developer applied by electro-deposition appears to have an extremely small particle size probably due to the avoidance of agglomerate formation which appears to fix grain size by other methods.

A favorable condition is that if the base to which the initial charge is applied is of the same or similar material to that of the developer, a transparency or print may be produced which is of chemically uniform material throughout and there is thus no separate base and developed image, the adhesion between which may fail in time.

Further, also according to our invention, a developed image may be fused by heat with the base on which the developer is applied. This may be done by the fusion of either the disperse material or powder of the developer, for example, borax or the like, or by the fusion of the resin or wax in the image such as guaiacum resin or dragon's blood or carnauba wax and the like.

As an example of the way in which the image and the base may be of the same material, the base may be of the zinc oxide-resin combination previously described and the developer may be such a combination dispersed in solvent naphtha or the like which evaporates to leave the zinc oxide-resin combination in the form of an image adhering to the zinc oxide-resin base and the total combination is homogeneous. In this case, the ratio or proportion of the respective agents to the bonding resist agent or resin is greater in the case of the photo-conductive insulating layer than in the case of the pigment or masking material.

What we claim is:

1. In an etching method wherein a substrate adapted for being attacked by a predetermined etchant is coated with a photoconductive insulating layer which is sequentially electrostatically charged and exposed to a light image and wherein a developer substance in a liquid carrier of high electrical resistivity is applied to the resulting electrostatic image to develop the image wherein said etchant is employed to etch the thusly processed substrate to remove portions of the substrate and photoconductive insulating layer which are free of developer substance; the improvement which comprises: preparing said photoconductive insulating layer from a photoconductor and bonding resist agent, preparing said developer substance from a pigment and bonding resist agent, the bonding resist agents being of the same material, the ratio of photoconductor to bonding resist agent being greater than the ratio of said pigment to bonding resist agent, the amount of bonding resist agent in the developer substance being sufficient to withstand attack by said etchant, the amount of bonding resist agent in the photoconductive insulating layer being less than the amount necessary to withstand attack by said etchant.

2. The improvement as claimed in claim 1 wherein the pigment and photoconductor are zinc oxide.

3. The improvement as claimed in claim 1 wherein the bonding resist agent is alkyd resin.

References Cited in the file of this patent

UNITED STATES PATENTS

| | | |
|---|---|---|
| 2,857,271 | Sugarman | Oct. 21, 1958 |
| 2,890,174 | Mayer | June 9, 1959 |
| 2,891,911 | Mayer et al. | June 23, 1959 |
| 2,907,674 | Metcalfe et al. | Oct. 6, 1959 |

OTHER REFERENCES

Sugarman: Electrofax. Previously of record; page 11 made of record.

Metcalfe: Liquid Developers for Xerography, J. Sci. Inst., vol. 32, No. 2, February 1955. Only p. 74 made of record. Copy available in Div. 17.

Electrofax, by Sugarman, May 1955, David Sarnoff Research Center, Princeton, New Jersey, pages 1, 7, 8 and 10. Copy in 96—1.